(12) United States Patent
Kim et al.

(10) Patent No.: US 8,145,160 B2
(45) Date of Patent: Mar. 27, 2012

(54) TX MODULE FOR WIRELESS COMMUNICATION

(75) Inventors: Ki Joong Kim, Jeollabuk-do (KR);
Shinichi Iizuka, Gyunggi-do (KR); Hyo Keun Bae, Gyunggi-do (KR); Sang Hee Kim, Seoul (KR); Joong Jin Nam, Seoul (KR); Youn Suk Kim, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 324 days.

(21) Appl. No.: 12/427,972

(22) Filed: Apr. 22, 2009

(65) Prior Publication Data

US 2010/0093292 A1    Apr. 15, 2010

(30) Foreign Application Priority Data

Oct. 14, 2008    (KR) .................. 10-2008-0100772

(51) Int. Cl.
*H04B 1/02* (2006.01)
(52) U.S. Cl. ............... 455/127.3; 455/103; 330/124 R
(58) Field of Classification Search .................. None
See application file for complete search history.

(56) References Cited

U.S. PATENT DOCUMENTS

| | | | |
|---|---|---|---|
| 5,132,637 A | 7/1992 | Swanson | |
| 5,410,280 A | 4/1995 | Linguet et al. | |
| 6,889,034 B1 * | 5/2005 | Dent | 455/102 |
| 7,675,365 B2 * | 3/2010 | Lee et al. | 330/295 |
| 7,746,174 B2 * | 6/2010 | Yang et al. | 330/295 |
| 2007/0026824 A1 | 2/2007 | Ono et al. | |
| 2007/0075783 A1 | 4/2007 | Weigand et al. | |
| 2009/0093270 A1 | 4/2009 | Block et al. | |

FOREIGN PATENT DOCUMENTS

| | | |
|---|---|---|
| DE | 69411809 T2 | 12/1998 |
| DE | 102006015072 A1 | 10/2007 |

OTHER PUBLICATIONS

German Search Report for application No. 102009020237.4, issued Jun. 7, 2010.

* cited by examiner

*Primary Examiner* — Lincoln Donovan
*Assistant Examiner* — Terry L Englund
(74) *Attorney, Agent, or Firm* — Lowe, Hauptman, Ham & Berner, LLP

(57) ABSTRACT

A Tx module includes a plurality of power amplification units, a plurality of matching circuit units configured as transformers having input ports connected to output ports of the plurality of power amplification units, respectively, and a plurality of harmonic filter units having input ports connected to output ports of the plurality of matching circuit units, respectively. At least one of the matching circuit units includes a plurality of primary windings connected to output ports of corresponding power amplifiers of the power amplification units and a secondary winding inductively coupled in common to the plurality of primary windings.

8 Claims, 3 Drawing Sheets

TX MODULE FOR WIRELESS COMMUNICATION

CROSS-REFERENCE TO RELATED APPLICATIONS

This application claims the priority of Korean Patent Application No. 2008-0100772 filed on Oct. 14, 2008, in the Korean Intellectual Property Office, the disclosure of which is incorporated herein by reference.

BACKGROUND OF THE INVENTION

1. Field of the Invention

The present invention relates to a module for signal transmission used in wireless communication devices and the like, and more particularly, to a Tx module for wireless communications, which includes a plurality of power amplifiers respectively amplifying Tx signals of different frequency bands, and a matching circuit employing a transformer structure for matching with the plurality of the power amplifiers.

2. Description of the Related Art

Complex terminals have recently been developed, each of which can receive wireless communications services using different frequency bands without being replaced with another mobile communication terminal. For example, in the case of the complex terminals, a single terminal can use wireless communications services using different frequency bands, such as GSM, E-GSM, DCS1800 and PCS1900.

As to the hardware for signal transmission of a complex mobile communication terminal, a Tx module for wireless communications is used to convert a baseband signal into a high-frequency radio signal (i.e., an RF signal), amplify the RF signal and provide the amplified RF signal to an antenna. Particularly, the complex mobile communication terminal handling multiple frequency bands needs to be able to process signals of different frequency bands using one Tx module.

A related art Tx module takes up a large area since it is manufactured using lumped elements for matching circuits and the like used in the Tx module. Particularly, more lumped elements are needed in order to implement a circuit using a plurality of power amplifiers for amplifying a signal of one frequency band. This makes it impossible for the related art Tx module to be small and lightweight.

SUMMARY OF THE INVENTION

An aspect of the present invention provides a Tx module for wireless communications, which can minimize increases in size, despite a plurality of power amplifiers, by employing a transformer as a matching circuit for matching with the plurality of power amplifiers.

According to an aspect of the present invention, there is provided a Tx module for wireless communications, including: a plurality of Tx signal input ports receiving Tx signals of different frequencies, respectively; a plurality of power amplification units having input ports connected to the plurality of Tx signal input ports, respectively; a plurality of matching circuit units configured as transformers having input ports connected to output ports of the plurality of power amplification units, respectively; a plurality of harmonic filter units having input ports connected to output ports of the plurality of matching circuit units, respectively; a switch unit having input ports connected to output ports of the plurality of harmonic filter units, respectively and selecting one of signals input through the input ports as output; and a gain/switching control unit controlling gains of the power amplification units and controlling the output selection of the switch unit; and a Tx signal output port connected to an output port of the switch unit.

The plurality of power amplification units may each include a plurality of power amplifiers amplifying Tx signals input through the Tx signal input port connected thereto. In this case, the matching circuit unit may include: a plurality of primary windings connected to output ports of the plurality of power amplifiers, respectively; a secondary winding inductively coupled in common to the plurality of primary windings.

The plurality of power amplification units may each include: a balun converting a TX signal input through the Tx signal input port connected thereto into a balanced signal; and a plurality of balanced power amplifiers connected in parallel to an output port of the balun and amplifying the balanced signal output from the balun. In this case, the matching circuit unit may include: a plurality of primary windings each having both ends connected to two output ports of a corresponding balanced power amplifier of the plurality of balanced power amplifiers; and a secondary winding inductive coupled in common to the plurality of primary windings.

The Tx module may further include: a switch control signal input port receiving a switch control signal provided from the outside of the Tx module to control the switch unit; and a gain control signal input port receiving a gain control signal for controlling a gain. The switch control signal input port and the gain control signal input port may be connected to an input port of the gain/switching control unit.

The plurality of power amplifiers may be manufactured through a complementary metal oxide semiconductor (CMOS) process, and the plurality of matching circuit units may be manufactured through an integrated passive device (IPD) process.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions and shapes of the elements are exaggerated for clarity of illustration.

Figure 1:
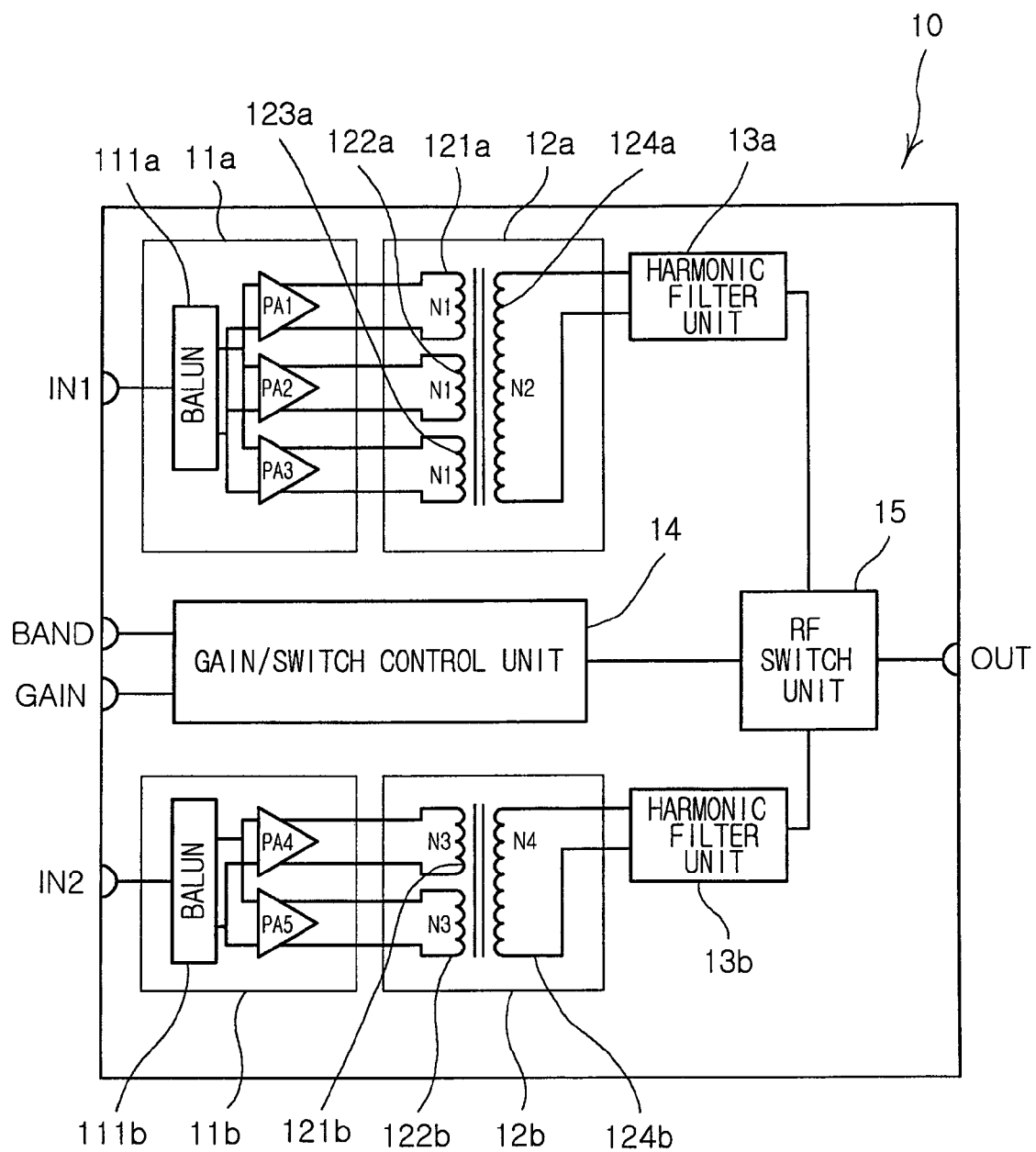
FIG. 1 is a block diagram of a Tx module for wireless communications, according to an exemplary embodiment of the present invention.

FIG. 1 is a block diagram of a Tx module for wireless communications according to an exemplary embodiment of the present invention.

Referring to FIG. 1, a Tx module 10 for wireless communications according to this embodiment of the present invention includes input and output ports IN1, IN2, OUT, BAND and GAIN, power amplification units 11a and 11b, matching circuit units 12a and 12b, harmonic filter units 13a and 13b, a switch unit 15 and a gain/switch control unit 14.

Among the input and output ports, a plurality of Tx signal input ports IN1 and IN2 each receive a Tx signal used for wireless communications using a different frequency band. For example, the Tx signal input port IN1 may receive a Tx signal of 1.8 GHz band for a personal communication service (PCS), and the Tx signal input port IN2 may receive a Tx signal of 900 MHz band for a global system for mobile communication (GSM) service. Although two Tx signals of different frequency bands are input in the embodiment of FIG. 1, the present invention is not limited thereto. For instance, those skilled in the art would be able to derive modifications including more than two Tx signal input ports from embodiments described herein within the scope of the present invention.

The power amplification units 11a and 11b have input ports connected to the Tx signal input ports IN1 and IN2, respectively. The power amplification units 11a and 11b amplify Tx signals input through the respective Tx signal input ports IN1 and IN2 connected thereto, and output the amplified signals.

As shown in FIG. 1, the power amplification unit 11a may include a plurality of power amplifiers PA1 through PA3, and the power amplification unit 11b may also include a plurality of power amplifiers PA4 and PA5.

When a balanced signal is used for more stable signal processing, the power amplification units 11a and 11b may further include baluns 111a and 111b that convert a Tx signal, an unbalanced signal, into a balanced signal, respectively. In the embodiment employing the baluns 111 and 111b, the power amplifiers PA1 through PA5 may be balanced power amplifiers each having two input ports for processing balanced signals. Furthermore, each of the plurality of power amplifiers PA1 through PA5 may be connected in parallel to an output port of a corresponding balun of the baluns 111a and 111b and thus can amplify balanced signals output from the baluns 111a and 111b.

The power amplification unit 11a including the power amplifiers PA1 through PA3, and the power amplification unit 11b including the power amplifiers PA4 and PA5 may be manufactured through a complementary metal oxide semiconductor (CMOS) process based on a silicon (Si) material, and may be integrated with the gain/switch control unit 14 (to be described later).

The matching circuit units 12a and 12b may be implemented as transformers having input ports connected to output ports of the plurality of power amplification units 11a and 11b, respectively. The transformer constituting the matching circuit unit 12a may include a plurality of primary windings 121a through 123a each having both ends connected to two output ports of a corresponding power amplifier of the power amplifiers PA1 through PA3, and one secondary winding 124a inductively coupled in common to the primary windings 121a through 123a. The currents induced from the respective primary windings 121a through 123a are added in the same phase at the secondary winding 124a. The turns ratio of each of the primary windings 121a through 123a to the secondary winding 124a may be N1:N2 where N1<N2 in order to boost the voltage from each of the primary windings 121a through 123a to the secondary winding 124a substantially to the ratio of N2/N1. For example, if N2 is 2 turns and N1 is 1 turn, the turns ratio is 1/2, and the voltage at the single secondary winding 124a may be boosted twice as high as the voltage at each of the primary windings 121a through 123a.

As described above, according to the present invention, the plurality of primary windings 121a through 123a and the secondary winding 124a inductively coupled thereto are used, so that impedance matching can be provided between the power amplifiers PA1 through PA3 and the load (the harmonic filter unit 13a in FIG. 1) connected to the secondary winding 124a of the transformer.

Likewise, the transformer of the matching circuit unit 12b may include a plurality of primary windings 121b and 122b, each having both ends connected to two output ports of a corresponding power amplifier of the power amplifiers PA4 and PA5, respectively, and one secondary winding 124b inductively coupled in common to the primary windings 121b and 122b. The matching circuit unit 12b has a similar configuration to that of the aforementioned matching circuit unit 12a except for the number of primary windings. Therefore, a detailed description thereof will be omitted.

Figure 2:
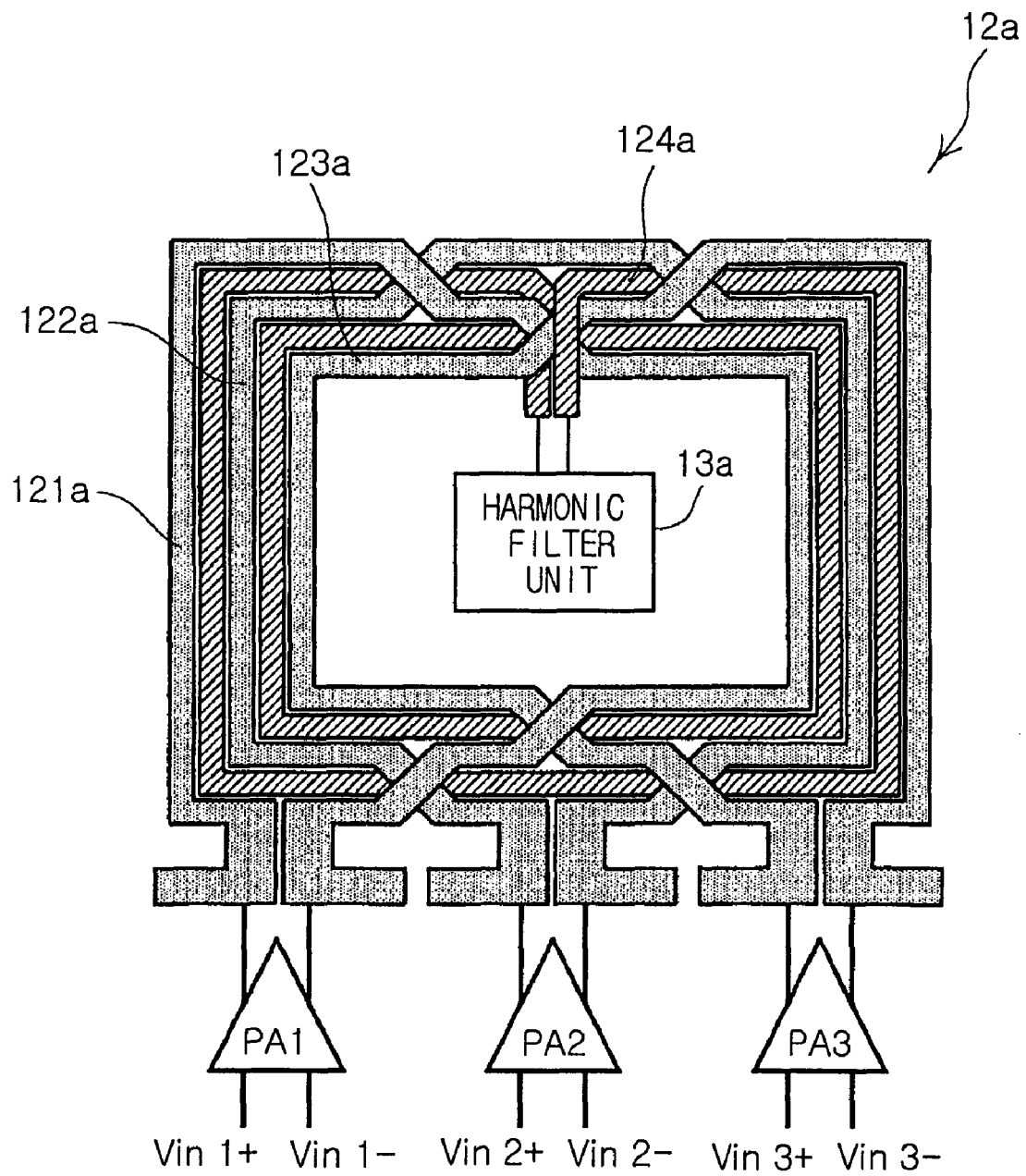
FIGS. 2 and 3 are views illustrating a plurality of power amplifiers and a matching circuit unit configured as a transformer according to an exemplary embodiment of the present invention.
Figure 3:
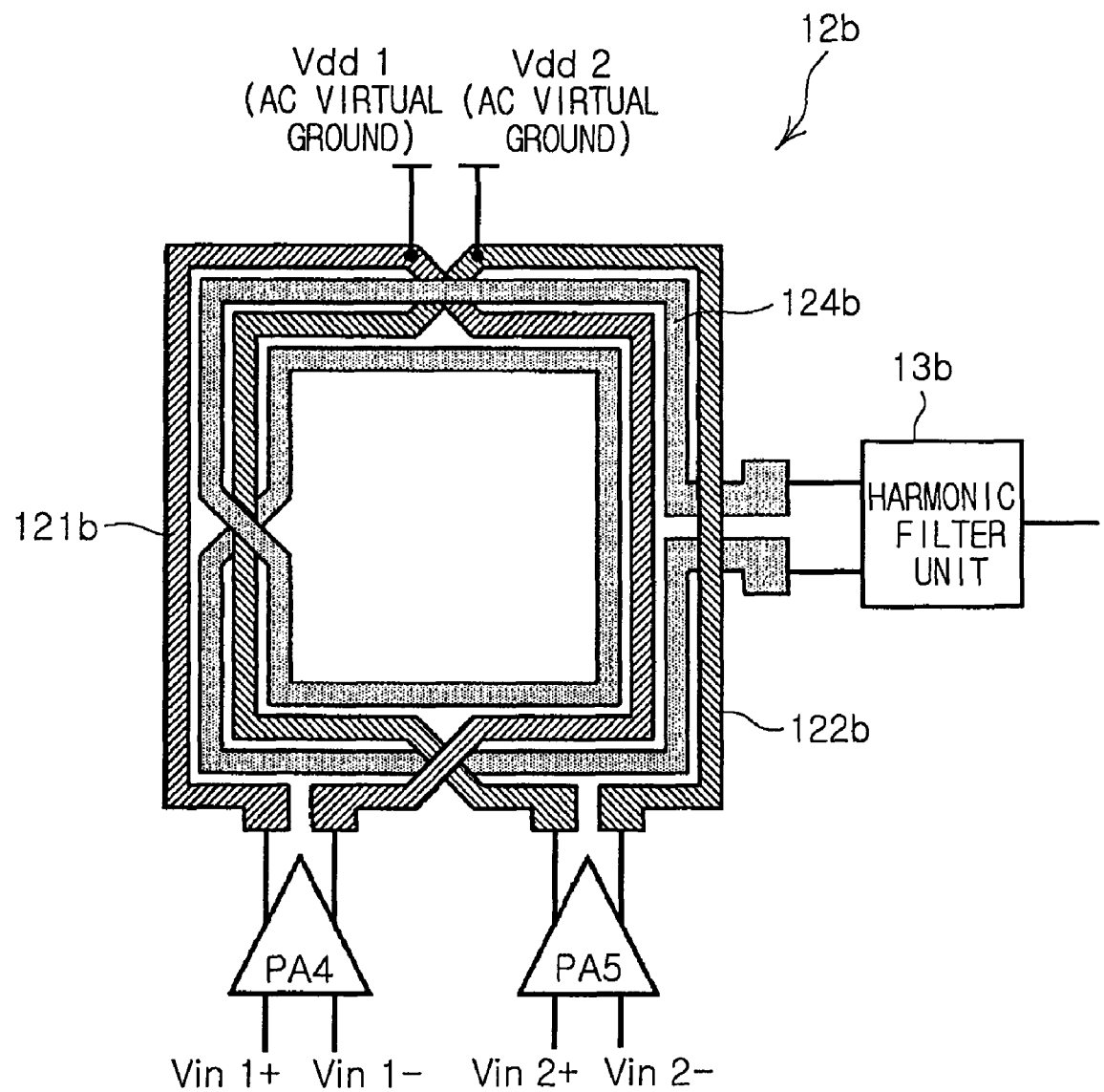

FIG. 2 is a view illustrating the plurality of power amplifiers PA1 through PA3, and the matching circuit unit 12a configured as a transformer. FIG. 3 is a view illustrating the plurality of power amplifiers PA4 and PA5, and the matching circuit unit 12b configured as a transformer.

FIG. 2 illustrates the layout structure of a transformer including the three primary windings 121a through 123a each having one turn and a secondary winding 124a having two turns. The three single-turn primary windings 121a through 123a and the one dual-turn secondary winding 124a may be used to combine the currents from the three balanced power amplifiers PA1 through PA3. According to an exemplary embodiment of the present invention, the currents magnetically induced by the excitation of the three primary windings 121a through 123a may be added in the same phase at the secondary winding 124a. According to an exemplary embodiment of the present invention, a transformer may be designed such that the currents of the primary windings 121a through 123a are all in the same direction to prevent self-cancellation.

Similarly, referring to FIG. 3, the transformer structure of the matching circuit unit 12b may include two primary windings 121b and 122b connected with one secondary winding 124b. The power amplifier PA4 may receive balanced inputs Vin 1+ and Vin 1− from the balun 111b and provide the primary winding 121b with a balanced output. Likewise, the power amplifier PA5 may receive balanced inputs Vin 2+ and Vin 2− from the balun 111b and provide the primary winding 122b with a balanced output. According to an exemplary embodiment of the present invention, the flux or currents induced by the respective primary windings 121b and 122b are added in the same phase at the secondary winding 124b. The secondary winding 124b having two turns may be connected to the harmonic filter unit 13b. Center tap ports receiving supply voltages Vdd1 and Vdd2 may be provided at the primary windings 121b and 122b, respectively. The center tap ports may exist on the AC virtual ground. The supply voltages Vdd1 and Vdd2 of the power amplifiers PA4 and PA5 may be provided through the center tap ports. The center tap port may be placed at the middle or symmetrical point of a corresponding primary winding of the primary windings 121b and 122b. Such center tap ports may also be provided at the primary windings 121a through 123a of FIG. 2.

As shown in FIG. 2, in the layout of the transformer constituting the matching circuit unit 12a, the primary windings 121a through 123a may be disposed parallel to one another, and the secondary winding 124a may be disposed between the primary windings 121a through 123a so that the primary windings 121a through 123 are not adjacent to one another. Likewise, as shown in FIG. 3, in the layout of the transformer constituting the matching circuit unit 12b, the primary windings 121b and 122b may be disposed parallel to each other, and the secondary winding 124b may be disposed between the primary windings 121b and 122b so that the primary windings 121b and 122b are not adjacent to each other.

The layouts of the respective transformers of the matching circuit units 12a and 12b may be manufactured through an integrated passive device (IPD) process. Thus, a significant reduction in size can be achieved as compared to the case of using lumped elements.

The plurality of harmonic filter units 13a and 13b are connected to output ports of the matching circuit units 12a and 12b, respectively. Also, the plurality of harmonic filter units 13a and 13b receive the currents induced to the secondary windings 124a and 124b of the transformers of the matching circuit units 12a and 12b to remove harmonic components from the received currents, respectively. Each of the harmonic filter units 13a and 13b may include a capacitor and an inductor connected to an output side of a corresponding matching circuit unit of the matching circuit units 12a and 12b in a variety of configurations. Like the matching circuit units 12a and 12b, the inductor and the capacitor constituting each of the harmonic filter units 13a and 13b may also be manufactured through the IPD process. The matching circuit unit 12a and the harmonic filter unit 13a, connected together, may be manufactured on a single substrate. Likewise, the matching circuit 12b and the harmonic filter unit 13b, connected together, may also be manufactured on a single substrate.

The switch unit 15 has two input ports connected to output ports of the plurality of harmonic filter units 13a and 13b, respectively. The switch unit 15 selects one of signals input through the input ports as the output and directs the output to be output through the output port OUT. The switch unit 15 may be implemented by using a radio frequency (RF) switch capable of high-speed operation within a high frequency band. The connection path of the switch unit 15 may be controlled by the gain/switch control unit 14.

The gain/switch control unit 14 is connected to a switch control signal input port BAND and a gain control signal input port GAIN. Here, the switch control signal input port BAND receives a switch control signal provided from the outside of the Tx module 10 to control the switch unit. The gain control signal input port GAIN receives a gain control signal for controlling the gains of the plurality of power amplifiers PA1 through PA5. The gain/switch control unit 14 receives the gain control signal and the switch control signal and may control the gain of the power amplifiers PA1 through PA3 of the power amplification unit 11a and the power amplifiers PA4 and PA5 of the power amplification unit 11b and control the connection path of the switch unit 15 according to the received signals.

To control the gains of the power amplifiers PA1 through PA5, the gain/switch control unit 14 may include a circuit known as a low dropout regulator (LDO). By use of the LDO circuit, the gain/switch control unit 14 controls the gains of the power amplifiers PA1 through PA5 by comparing the voltages provided to the power amplifiers PA1 through PA5 with the gain control signal applied from the outside through the gain control signal input port GAIN. LDO may be implemented by using, for example, a metal oxide semiconductor field effect transistor (MOSFET) and an operational amplifier.

To control the operation of the switch unit 15, the gain/switch control unit 14 may be implemented as a decoder that decodes a switch control signal input from the switch control signal input port BAND into a signal for operating the switch unit 15.

The LDO circuit and the decoder may be implemented by using the CMOS process. Thus, the LDO circuit and the decoder may be manufactured integrated with the power amplification units 11a and 11b through a single process, since the power amplification units 11a and 11b are also implemented through the CMOS process.

As described above, according to the present invention, a transformer structure is employed as a matching circuit for matching with a plurality of power amplifiers. Accordingly, a Tx module employing a plurality of power amplifiers can be made to be small and lightweight.

According to the present invention, a small and lightweight Tx module can be achieved by use of a transformer structure for a matching circuit for matching with a plurality of power amplifiers.

While the present invention has been shown and described in connection with the exemplary embodiments, it will be apparent to those skilled in the art that modifications and variations can be made without departing from the spirit and scope of the invention as defined by the appended claims.

What is claimed is:

1. A Tx module for wireless communications, comprising:
   a plurality of Tx signal input ports configured to receive Tx signals of different frequencies, respectively;
   a plurality of power amplification units having input ports connected to the plurality of Tx signal input ports, respectively;
   a plurality of matching circuit units configured as transformers having input ports connected to output ports of the plurality of power amplification units, respectively;
   a plurality of harmonic filter units having input ports connected to output ports of the plurality of matching circuit units, respectively;
   a switch unit having input ports and an output terminal, the input ports of the switch unit connected to output ports of the plurality of harmonic filter units, respectively, and the switch unit being configured to selectively direct a signal applied on one of the input ports of the switch unit to the output terminal of the switch unit;
   a gain/switching control unit configured to control gains of the power amplification units and to control the switch unit; and
   a Tx signal output port connected to the output terminal of the switch unit,
   wherein each of the plurality of power amplification units comprises a plurality of power amplifiers configured to amplify corresponding Tx signals,
   wherein at least one of the transformers of the matching circuit units comprises:
   a plurality of primary windings connected to output ports of corresponding power amplifiers; and
   a secondary winding inductively coupled in common to the plurality of primary windings.

2. The Tx module of claim 1, further comprising:
   a switch control signal input port configured to receive a switch control signal provided from the outside of the Tx module to control the switch unit; and
   a gain control signal input port configured to receive a gain control signal for controlling the gains of the power amplification units,
   wherein the switch control signal input port and the gain control signal input port are connected to respective input ports of the gain/switching control unit.

3. The Tx module of claim 1, wherein the plurality of power amplifiers are manufactured through a complementary metal oxide semiconductor (CMOS) process, and the plurality of matching circuit units are manufactured through an integrated passive device (IPD) process.

4. A Tx module for wireless communications, comprising:
- a plurality of Tx signal input ports configured to receive Tx signals of different frequencies, respectively;
- a plurality of power amplification units having input ports connected to the plurality of Tx signal input ports, respectively;
- a plurality of matching circuit units configured as transformers having input ports connected to output ports of the plurality of power amplification units, respectively;
- a plurality of harmonic filter units having input ports connected to output ports of the plurality of matching circuit units, respectively;
- a switch unit having input ports and an output terminal, the input ports of the switch unit connected to output ports of the plurality of harmonic filter units, respectively, and the switch unit being configured to selectively direct a signal applied on one of the input ports of the switch unit to the output terminal of the switch unit;
- a gain/switching control unit configured to control gains of the power amplification units and to control the switch unit; and
- a Tx signal output port connected to the output terminal of the switch unit,
- wherein each of the plurality of power amplification units comprises:
  - a balun converting one of the Tx signals input through a corresponding Tx signal input port connected thereto into a balanced signal; and
  - a plurality of balanced power amplifiers connected in parallel to an output port of the balun and configured to amplify the balanced signal output from the balun,
- wherein at least one of the transformers of the matching circuit units comprises:
  - a plurality of primary windings each having both ends connected to two output ports of a corresponding balanced power amplifier of the plurality of balanced power amplifiers; and
  - a secondary winding inductive coupled in common to the plurality of primary windings.

5. The Tx module of claim 4, further comprising:
- a switch control signal input port configured to receive a switch control signal provided from the outside of the Tx module to control the switch unit; and
- a gain control signal input port configured to receive a gain control signal for controlling the gains of the power amplification units,
- wherein the switch control signal input port and the gain control signal input port are connected to respective input ports of the gain/switching control unit.

6. The Tx module of claim 4, wherein the plurality of balanced power amplifiers are manufactured through a complementary metal oxide semiconductor (CMOS) process, and the plurality of matching circuit units are manufactured through an integrated passive device (IPD) process.

7. A Tx module for wireless communications, comprising:
- an output port;
- a first balun configured to receive a first Tx signal and output a first balanced signal;
- a first set of amplifiers configured to amplify the first balanced signal;
- a first matching circuit configured to receive a first set of amplified signals from the first set of amplifiers and to generate a first matched signal, the first matching circuit comprising:
  - a plurality of primary windings each connected to a corresponding one of the first set of amplified signals; and
  - a secondary winding inductively coupled in common to the plurality of primary windings;
- a first harmonic filter configured to receive the first matched signal and to generate a first filtered signal;
- a second balun configured to receive a second Tx signal and output a second balanced signal;
- a second set of amplifiers configured to amplify the second balanced signal;
- a second matching circuit configured to receive a second set of amplified signals from the second set of amplifiers and to generate a second matched signal, the second matching circuit comprising:
  - a plurality of primary windings each connected to a corresponding one of the second set of amplified signals; and
  - a secondary winding inductively coupled in common to the plurality of primary windings;
- a second harmonic filter configured to receive the second matched signal and to generate a second filtered signal; and
- a switch unit configured to receive the first filtered signal and the second filtered signal and to selectively couple one of the first filtered signal and the second filtered signal to the output port.

8. The Tx module of claim 7, wherein the windings of the first matching circuit and the second matching circuit are planar coils.

* * * * *